(12) United States Patent
Carhuff

(10) Patent No.: US 7,185,921 B2
(45) Date of Patent: Mar. 6, 2007

(54) HOSE FITMENT FOR DISPOSABLE FOOD CONTAINER

(75) Inventor: Peter W. Carhuff, Eau Claire, WI (US)

(73) Assignee: Nestec S.A., Vevey (CH)

( * ) Notice: Subject to any disclaimer, the term of this patent is extended or adjusted under 35 U.S.C. 154(b) by 692 days.

(21) Appl. No.: 10/187,941

(22) Filed: Jun. 28, 2002

(65) Prior Publication Data

US 2004/0000792 A1    Jan. 1, 2004

(51) Int. Cl.
*F16L 33/00*    (2006.01)

(52) U.S. Cl. .......................... 285/255; 285/414; 285/3
(58) Field of Classification Search ............... 285/414, 285/242, 921, 403, 417, 398, 3, 900, 255; 215/900
See application file for complete search history.

(56) References Cited

U.S. PATENT DOCUMENTS

| | | | | | |
|---|---|---|---|---|---|
| 185,326 | A | * | 12/1876 | Jones ........................ 285/242 |
| 509,458 | A | * | 11/1893 | Still ........................... 285/398 |
| 3,943,888 | A | * | 3/1976 | Nordegren et al. ...... 119/14.05 |
| 4,022,205 | A | * | 5/1977 | Tenczar ........................ 285/3 |
| 4,049,034 | A | * | 9/1977 | Vcelka et al. ............... 285/242 |
| 4,236,736 | A | * | 12/1980 | Anderson .................... 285/398 |
| 4,265,280 | A | * | 5/1981 | Ammann et al. ............. 141/98 |
| 4,325,417 | A | * | 4/1982 | Boggs et al. ................. 141/98 |
| 4,340,097 | A | * | 7/1982 | Ammann et al. ............. 141/98 |
| 4,635,972 | A | * | 1/1987 | Lyall .......................... 285/242 |
| 4,826,477 | A | | 5/1989 | Adams ......................... 604/4 |
| 5,967,197 | A | * | 10/1999 | Shown ......................... 141/18 |
| 6,050,608 | A | * | 4/2000 | Hattori et al. ............... 285/242 |
| 6,345,431 | B1 | * | 2/2002 | Greig .......................... 285/242 |
| 6,416,085 | B1 | * | 7/2002 | Markovic ................... 285/242 |

FOREIGN PATENT DOCUMENTS

FR    2 459 663    1/1981
GB    715 070    8/1954

* cited by examiner

*Primary Examiner*—David Bochna
(74) *Attorney, Agent, or Firm*—Winston & Strawn LLP

(57) ABSTRACT

A hose fitment for the connection of disposable food containers to dispensing lines of food dispenser. This hose fitment is adapted to securely establish fluid connection between a hose and a food or beverage dispensing line. This fitment includes a body member having a first engaging surface for internally engaging a hose end and a sleeve member that includes a second engaging surface that externally engages around the hose end to press on the hose end against the first engaging surface in a manner effective to create a tight seal between the fitment and the hose end.

20 Claims, 5 Drawing Sheets

HOSE FITMENT FOR DISPOSABLE FOOD CONTAINER

FIELD OF THE INVENTION

The invention relates to a hose fitment, particularly for the connection of disposable food containers to dispensing lines of food dispenser and the like. The invention is more particularly useful for making an inexpensive, reliable and sanitary coupling for aseptic food containers containing microbiologically sensitive fluids such as milk or milk based concentrates, soft ice, culinary fluids and the like.

BACKGROUND ART

In the foodservice industry, it is usual to serve beverages or food prepared in dispensing systems on demand from beverage-forming or food-forming bases such as concentrates or ready-to-use components that are stored in disposable containers such as flexible bags, bag-in-box type packages and the like. The beverage or food base is usually drawn off by mechanical means or by gravity or a combination of both from a bag through a portion of hose attached to a dispensing line by a hose fitment. The hose fitment serves the purpose to conveniently and quickly establish fluid connection from the source of beverage or food base to the dispensing line.

When microbiologically sensitive fluids are at stake, such as with low acidified or neutral concentrates, for instance milk and the like, hygienic problems may arise that require specific care and periodical cleaning of the dispensing lines. One possibility consists in placing a sanitary manifold system in connection with the fitment of the container so as to periodically flush in the fitment and the dispensing line to remove, clean and rinse any food deposit and eventually destroy any bacterial colonies that may have started growing.

A co-pending patent application by P. W. Carhuff et al. entitled: "SANITARY MANIFOLD SYSTEM AND METHOD FOR HYGIENICALLY DISPENSING FLUIDS" filed on even date herewith proposes an invention that meets the need for regular cleaning and rinsing of the terminal end and dispensing lines. The content of that application is expressly incorporated herein by reference thereto.

Known fitments usually have a coupling portion and a simple gland extending rearward the coupling portion to attach to the hose. The fitment gland usually has to be sufficiently long to create an effective tight seal. If made too short, it may leak and contamination may occur, in particular, in crevasses, junction lines or dead zones. If too long, the fitment can pinch the hose when not dispensing the fluid at a remote location distance from the fitment port. Hence, the further away the pinch point is, the higher the hygienic risk, since the portion of hose and fitment to be cleaned increases.

Therefore, there is a need for a novel fitment that can be made shorter than known fitments to reduce the distance between the pinch point of the tube and the fitment port that interfaces with the dispensing lines, e.g., a cleaning or rinsing system, while providing a tight seal with no leakage issue with the surroundings. There is also a need for a fitment which provides a connection of improved resistance and tightness.

The present invention now satisfies these needs.

SUMMARY OF THE INVENTION

The present invention relates to a hose fitment adapted to securely establish fluid connection between a hose and hose retaining means of a beverage or food dispensing line, comprising a first body member having a socket extending along a longitudinal axis over which a hose end can be fitted and a terminal circumferential abutting wall demarcating a fluid outlet, a second member, preferably of a ring-shaped sleeve, comprising a bore adapted to externally snugly engage around the hose end to press on the hose end against the socket of the body member whereby a tight seal can be created.

Such an arrangement results in a more compact fitment which requires a lower contact surface with the hose end while ensuring an improved tightness to the fluid traveling through the hose and fitment toward the dispensing line. Hence the fitment can be used in connection with a hose for which flow control, for instance by means of a pinch valve, can be made closer to the fitment's outlet in order to reduce the microbiologically sensitive portion of hose. As a result, the portion of hose to be cleaned or rinsed downstream the pinch point by a cleaning or rinsing fluid when in operation in a dispensing unit can be reduced accordingly thus limiting the risks of microbial contamination and growth.

In a preferred aspect of the invention, the sleeve is ring-shaped and comprises coupling means adapted to engage the complementary hose retaining means of the dispensing line. Thus, the coupling means can be supported by a piece that also exerts the function of securing the hose end to the fitment. Hence, the fitment can be made less cumbersome as there is no more requirement for a hose's connecting extension, e.g., a gland, for connecting the fitment to the hose.

More preferably, the socket of the body member and bore of the sleeve have differing surface shapes arranged to form a wedge effect on the hose end and resist disengagement upon pulling is exerted on the hose. Hence, the connection of the fitment to the hose is made stronger as pulling efforts on the hose or fitment are borne by the ring-shaped sleeve itself. Therefore, contrary to a normal fitment, in which pulling efforts on the hose tends to disconnect the hose from the fitment; in the present invention, the pulling efforts on the hose tend to increase the pressure of connection of the sleeve onto the hose end against the body member of the fitment.

The coupling means of the fitment for the fitment engagement to a dispensing line, such as to a sanitary manifold system, may take various configurations and shapes that are at the ability of skilled artisans. For instance, the coupling means may comprise a groove that complementary fits a holder of a retaining arrangement of the dispensing line. In an alternative, the coupling means may comprise at least one rib that cooperates with complementary shapes of the retaining means of the line.

The invention also encompasses a beverage or food disposable container comprising a reservoir of microbiologically sensitive food or beverage base, a hose attached to the reservoir and the fitment as previously defined and closed by a puncturable membrane. More preferably, the reservoir is a package containing a shelf stable low acid concentrate, such as milk based concentrates.

The invention also relates to a hose fitment adapted to securely establish fluid connection between a hose and hose retaining means of a food or beverage dispensing line comprising a body member having a first engaging surface for internally engaging a hose end and a sleeve member comprising a second engaging surface that externally engages around the hose end to press on the hose end against the first engaging surface in a manner effective to create a tight seal between the fitment and hose end.

BRIEF DESCRIPTION OF THE DRAWINGS

Specific embodiments of the invention will now be described with reference to the drawings of which.

DETAILED DESCRIPTION OF THE PREFERRED EMBODIMENTS

Figure 1:
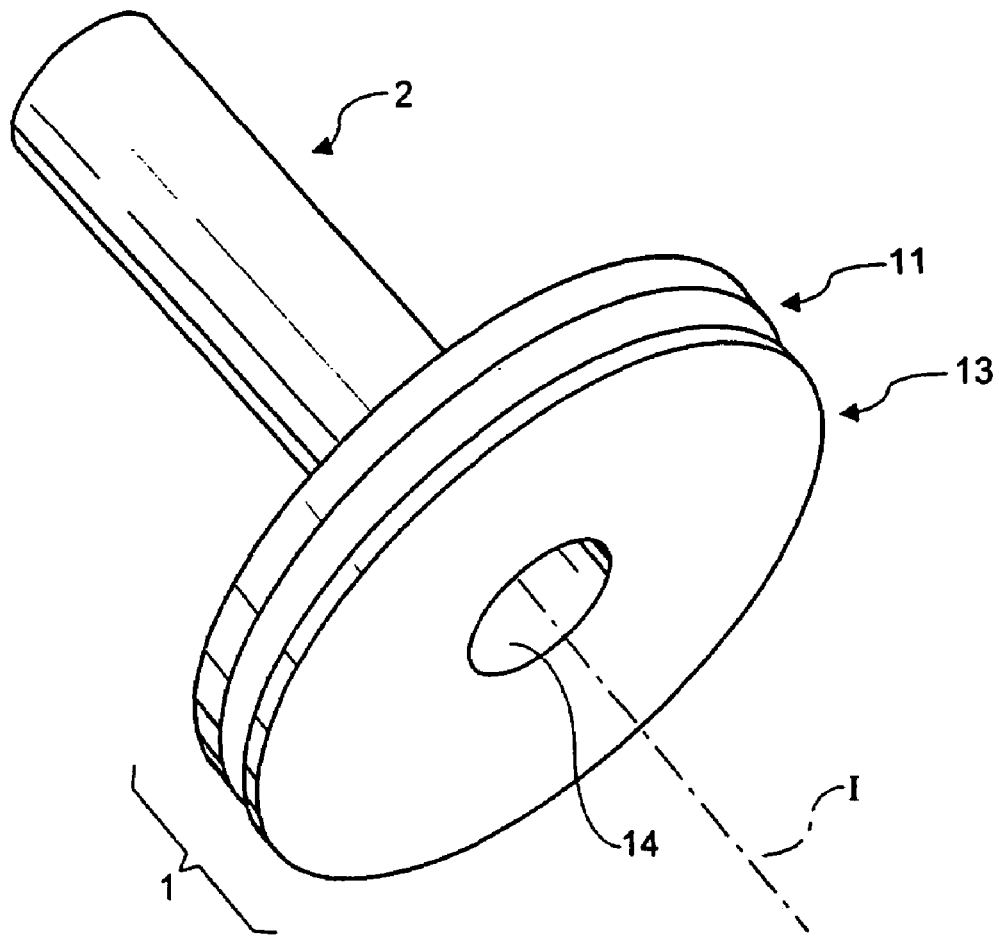
FIG. 1 is a perspective view of a fitment of the invention attached to a portion of hose.
Figure 6:
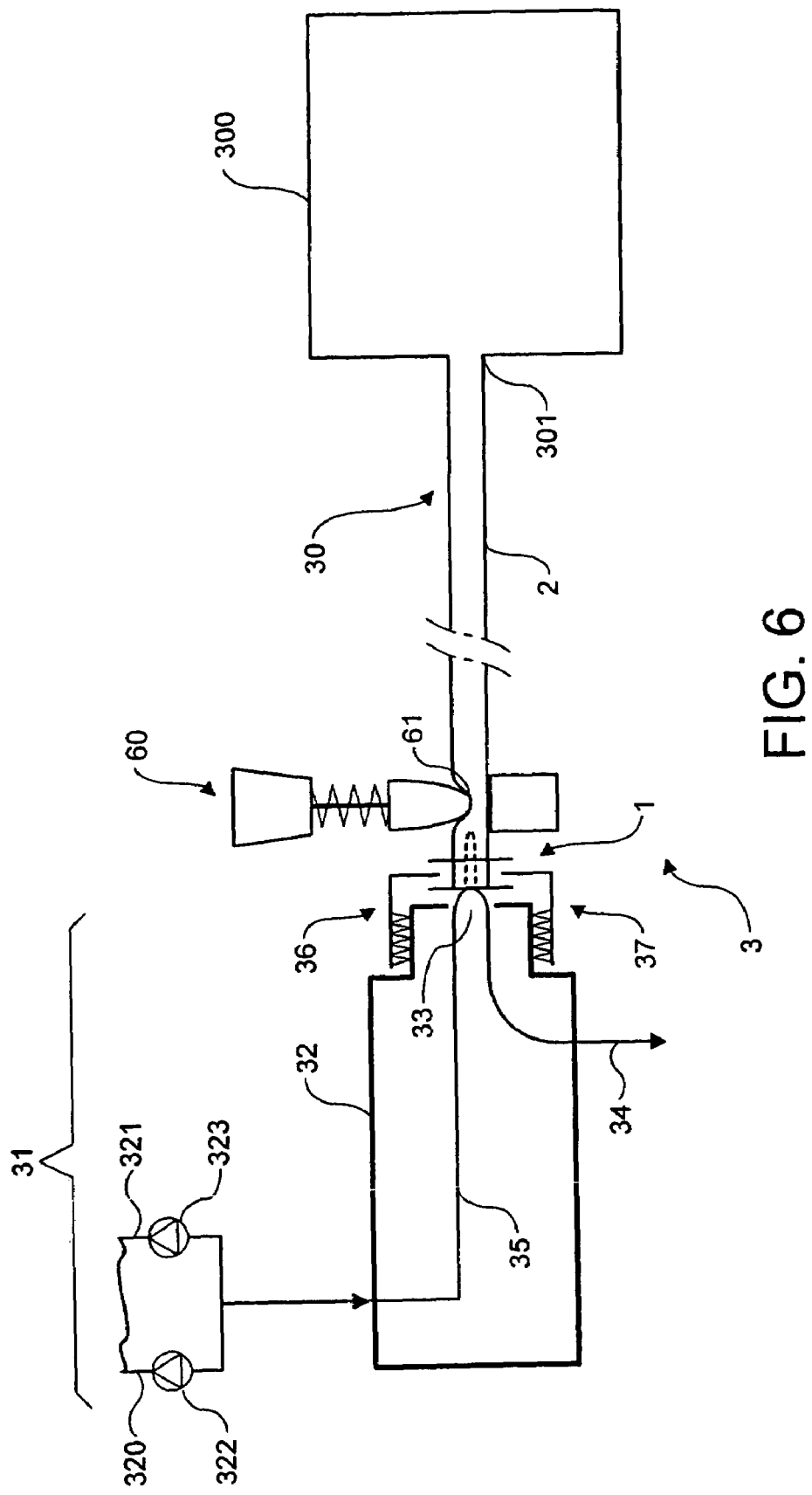
FIG. 6 illustrates in schematic view the attachment of a container using the fitment of the invention to a sanitary manifold system.

Referring in detail to the drawings, the numeral 1 indicates the fitment as first shown in FIG. 1, the numeral 2 indicates the hose adapted to attach to the fitment and the numeral 3 indicates a sanitary product supply assembly, as a whole, as illustrated in FIG. 6.

Figure 2:
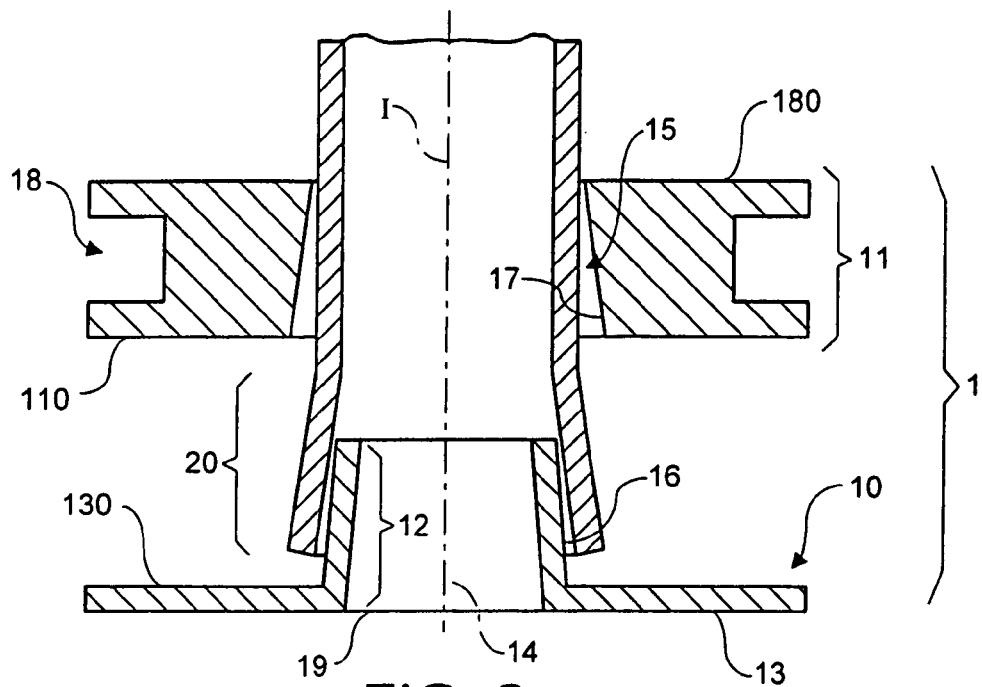
FIG. 2 is a cross-section view of the fitment of FIG. 1 that shows the closing of the fitment.
Figure 3:
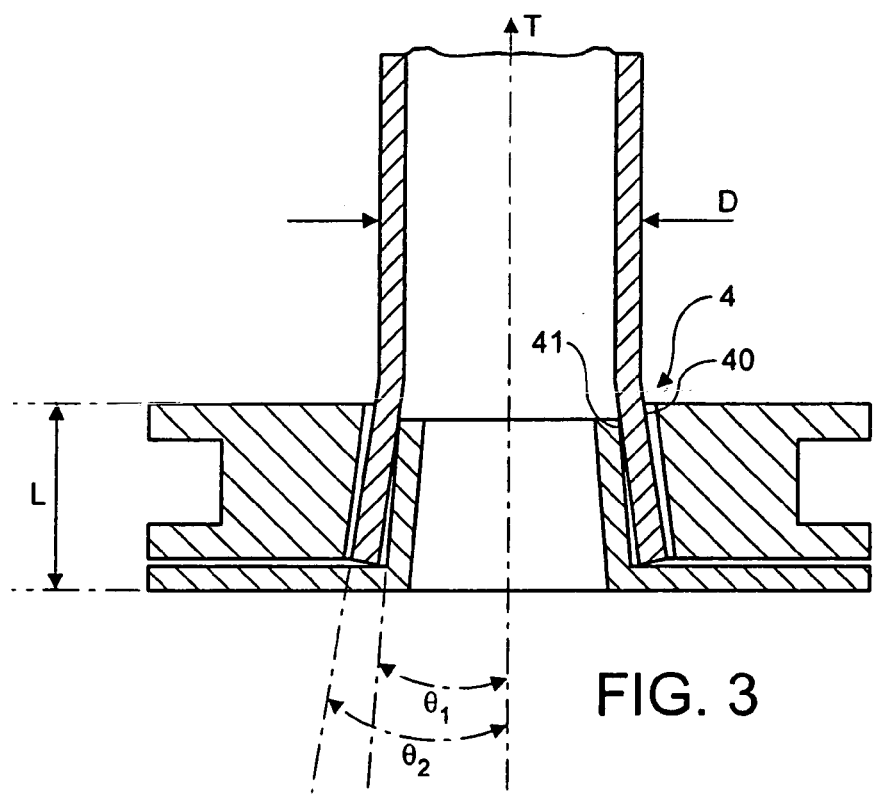
FIG. 3 is a cross-section view of the fitment of FIG. 2 when the fitment is attached to the portion of hose.

As illustrated in FIGS. 1 to 3, the fitment of the invention is thus composed of two main pieces, namely a first body member 10 and a ring-shaped sleeve 11 which when assembled and secured together to a terminal part or end 20 of a hose form a fluid tight assembly between the fitment and the hose 2. The material to be transferred through the fitment can be any sort of liquid or semi-liquid fluid but preferably a microbiologically sensitive component such as a concentrate, a ready-to-use food, a ready-to-drink beverage, soft ice cream or sorbet, a clinical solution and the like, drawn off by means of a pump from a flexible or rigid container, which may be a pouch or bag, to a dispensing line. In a preferred application, the fluid is a milk or milk based concentrate for reconstitution of hot or cold beverages in dispensing machines that, preferably, do not need refrigeration. The concentrate can be maintained in aseptic conditions in the container when it is closed and, once open, it can be dispensed at ambient temperature without risking microbial hazards. Due to its specific construction, the fitment of the invention participates to the maintenance of favorable hygienic conditions of dispense.

As shown in FIG. 2, the first body member 10 of the fitment includes a portion of tube or socket 12 that extends along a longitudinal axis I. The socket 12 forms a tubular engaging surface with an external section that is adapted to the nominal internal diameter of the hose end 20 to be connected to. Preferably, the hose is made of resilient plastic material that slightly stretches to snuggly fit onto socket 12. A terminal abutting wall 13 is provided at a first end of the socket 12 that demarcates a central fluid inlet 14 of axis I. When the hose is fitted onto the socket, the terminal abutting wall forms an abutting element that determines the hose length that needs to be engaged therein.

The fitment further comprises a second member 11 that is a sleeve preferably having the form of ring with an internal bore 15 forming a second engaging surface with the hose end. The bore of the sleeve 11 is adapted to snuggly engage the external surface of the hose end 20 so as to create a fluid tight connection as shown in FIG. 3. More particularly, the socket 12 and bore 15 have differing surface shapes arranged to form wedging on the hose end so that the hose end can resist disengagement upon pulling is exerted onto it. In a preferred embodiment, the socket 12 possesses an engaging surface 16 that progressively tapers in the direction of the hose to form an inclination $\theta_1$ with respect to the longitudinal axis I, whereas the bore 15 possesses an engaging surface 17 that also progressively tapers in the same direction but making an inclination $\theta_2$ that is higher than $\theta_1$ so as to create a wedge area 4 that pinches the hose proximate the external radial surface 180 of the sleeve 11. Hence, the hose is properly secured between the socket and sleeve while it resists to a pulling force in outward direction T.

Figure 7:
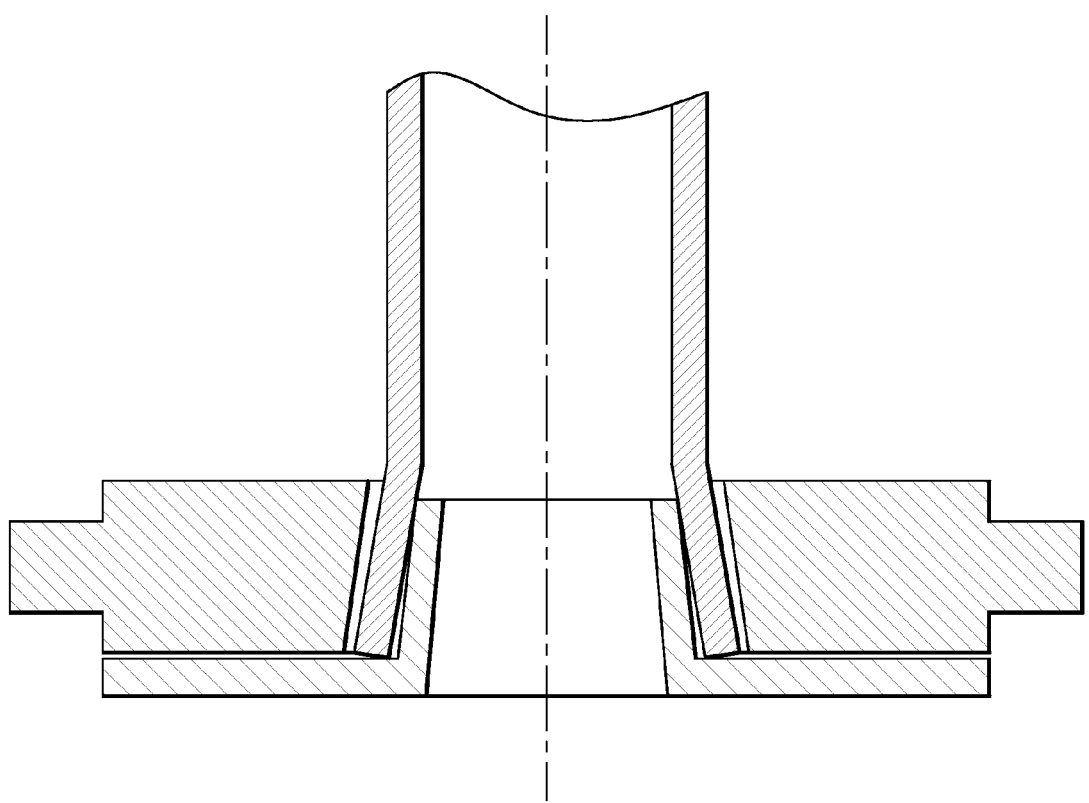
FIG. 7 is a cross-section view of a closing configuration to illustrate an embodiment which includes ribs according to the invention.

The sleeve 11 further supports coupling means 18 adapted to complementary fits to retaining means of a dispensing line as it will be later explained. The coupling means may be a circumferential groove as shown in FIG. 3, or a circumferential rib, as shown in FIG. 7. As it can be easily understood, when the fitment is secured to a dispensing line by the coupling means 18, forces pulling on the hose in direction T generates a reaction force of the sleeve at the wedge area 4 that increases the pressure on the hose end therefore maintaining the hose end even more firmly in place within the fitment. As a result, the bore and socket of the fitment do not necessarily need to be of an extensive length since there is sufficient pressure to create a tight and resistant seal. More preferably, the body member and sleeve can engage along a hose length L that is equal to or shorter than the external diameter D of the hose without risking any leakage problem. For instance, the hose external diameter D may be usually of about 1 to 1.5 cm; whereas the fitment length may usually vary of from 0.5 to 1.2 cm. Excellent results have been obtained with D being of 1.2 cm and L being of 0.8 cm. The fitment is preferably made of food grade plastic such as polyolefins, polyamides, polystyrenes or tetrafluoropolyethylenes.

More preferably, the sleeve comprises a front surface 110 that mates against the internal surface 130 of the abutting wall 13 of first body member. Even preferably, the two surfaces 110, 130 are securely attached by connection means such as gluing, heat sealing, ultrasonic welding, snap fitting or a combination thereof. Thus, as can be seen in FIG. 3, this makes the path for the fluid to escape out of the hose more tortuous since if the fluid seeks its way out it meets at least two restricted areas 40, 41. Furthermore the end hose is held by friction with the surface of the socket and sleeve but it could also be held by snap-locking, an adhesive or a heat sealed connection to ensure an even higher degree of safety and tightness.

More preferably, the fitment may be closed by a tamper evident membrane 19 that closes the outlet 14. The membrane can be attached onto the outer surface of the abutting wall 13 by any suitable technology such as by heat sealing, vibration sealing, adhesive, or any other equivalent means. The connection may be permanent or removable depending upon the needs of the user. The membrane 19 may be punctured at the time of opening the hose if the membrane is fixedly attached to establish fluid connection or, alternatively, the membrane can be peeled off in case the connection is made with a peelable joint, for instance.

Figure 4:
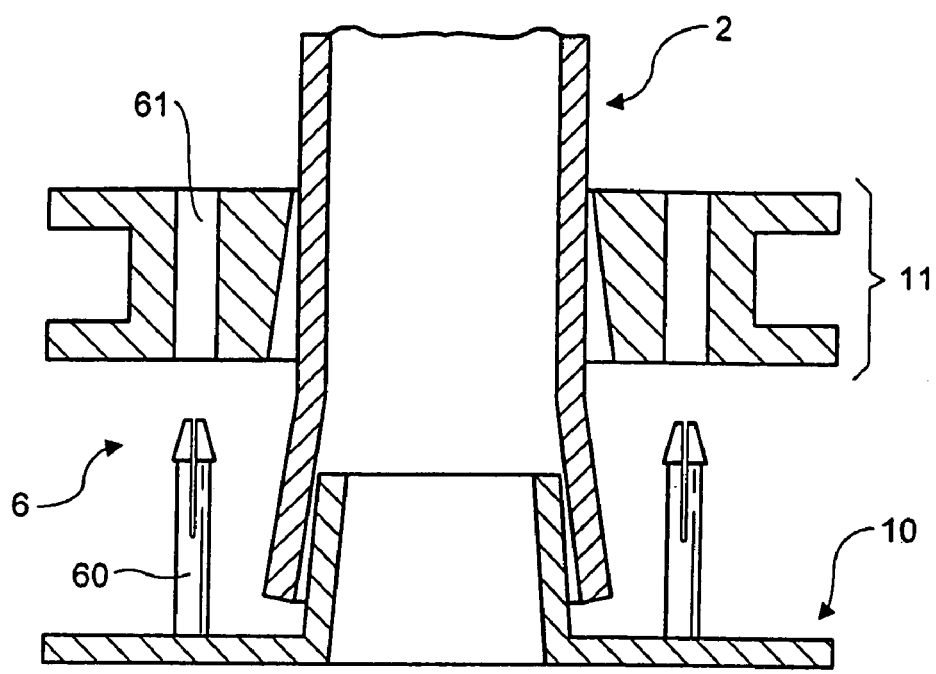
FIG. 4 is a cross-section view that shows the closing of the fitment according to a second embodiment of the invention.
Figure 5:
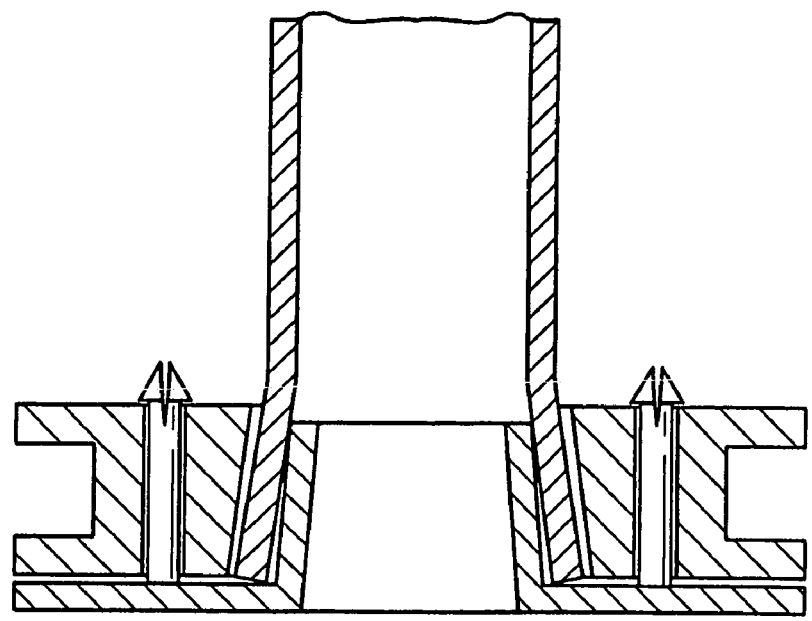
FIG. 5 a cross-section view in closing configuration according to the second embodiment of the invention of FIG. 4.

FIGS. 4 and 5 show an embodiment in which the body member and the sleeve are attached by a snap fitting connection 6 that may include a plurality of pins 60 of a first piece adapted to fit in a plurality of apertures 61 of the other piece. Such a construction provides the benefit of a convenient and quick connection with the hose without requiring a sealing station to be installed on the production line.

As shown in FIG. 6, a sanitary beverage or food supply assembly 3 can typically be integrated in a dispensing device such as a beverage dispenser to hygienically reconstitute beverages on demand. The assembly comprises a disposable sub-assembly or container 30 that is removably attached to a sanitary manifold system 31. The manifold system 31 comprises a housing 32 having an interface port 33 for establishing beverage or food fluid connection from the container 30 to a dispensing line 34. The manifold system is adapted for being traversed and flushed through a flushing line 35 by cleaning and/or rinsing fluids coming from cleaning or rinsing lines 320, 321. The cleaning and/or rinsing fluids may encompass hot or cold water, chemical agents, steam, and combinations thereof. The selection and opening of the cleaning or rinsing lines can be made by means of valves 323 controlled by a controlling system (not shown).

The container assembly 30 preferably includes a package 300 containing the beverage or food base, a hose 2 that terminates by the fitment 1 of the invention. The package may typically be a bag-in-box type package or any similar disposable flexible package that is easy and convenient for transportation and storage. The hose 2 may preferably be directly sealed or crimped to the package port 301 and be made of materials that are compatible for sealing with the package material. The container assembly with its membrane may preferably be sterilized, such as by irradiation, prior to filling. Filling of the food liquid is preferably aseptically done. Aseptic filling may be carried out by a filling port or aperture provided in the package itself or by filling the fitment attached to the hose which is subsequently properly sealed. Therefore, such a container assembly can be maintained aseptical until the membrane is punctured or, alternatively peeled off which provides the benefit to transport, store and load the container in the dispensing unit at ambient temperature. Such a flexible pouch and hose assembly is described in further details in U.S. Pat. No. 6,024,252 to Clyde entitled: "Dispenser System" the content of which is expressly incorporated herein by reference.

The container assembly is connected to the manifold system with its fitment 1 connected to the interface port 33 and the hose 2 engaged in a pinch valve 60 or similar that can maintain the upstream portion of the hose and package sterile. Additional valve(s) and pumping means are usually provided to ensure a control of the flow of product to the dispensing line (not shown).

The manifold system comprises retaining means 36 that complementarily engages in a convenient and removable manner the terminal fitment 1 of the invention. The configuration of the coupling means may widely vary depending upon the type and shape of the fitment to be locked at the interface port 33. The coupling should be able to provide a watertight connection at the interface port in order to establish a reliable and secure fluid communication between the container and the dispensing line 34 of the sanitary manifold system. In a preferred mode, there is provided a spring loaded holding system 37 adapted to engage the coupling means of the fitment that elastically forces the fitment to the interface port. It is clear that the connection between the fitment 1 and the manifold system 31 could be carried out by any other equivalent means such as by cam or lever type mechanisms to provide substantially the same result without departing from the spirit of the invention.

In a cleaning or rinsing mode, the manifold system is capable of directing cleaning or rinsing fluid within the fitment up to the pinch point 61 so as to regularly clean or rinse this critical portion of the container assembly. In such a configuration, the pinch valve ensures the upstream part of the container assembly remains isolated and sterile.

Importantly, it can be easily understood that the shortened construction of the fitment 1 enables to effectively reduce the downstream portion of the hose that requires cleaning or rinsing. The fitment also gives very little opportunity for the micro-organism to settle as the contact with the fluid is confined along a short tubular internal surface of socket. Hence, the hygienic conditions of dispensed can be successfully improved and the risks of bacterial contamination and growth are proportionally reduced. As a result, an aseptically processed container containing low acid concentrate such as milk concentrate with relatively low water activity can be dispensed at ambient temperature in the dispensing unit without requiring refrigeration of the container. This provides an important cost advantage for the operator as compared to known dispensers that dispense whitened beverages from refrigerated milk.

Further details regarding the manifold system and the method for hygienically supplying a microbiologically sensitive fluid from a container is described in co-pending US patent application by P. W. Carhuff et al. filed on even date herewith entitled "SANITARY MANIFOLD SYSTEM AND METHOD FOR HYGIENICALLY DISPENSING A MICROBIOLOGICALLY SENSITIVE FLUID" which, as noted above, is incorporated herein by reference.

What is claimed is:

1. A food and beverage hose fitment for securely establishing a fluid connection between a hose having an external diameter and a hose retaining means of a beverage or food dispensing line, consisting of: (a) a first body member having a socket extending along a longitudinal axis; said socket having a first engaging surface for internally engaging a hose end; said socket further comprising a first free end and a second end terminating by a terminal circumferential abutting wall demarcating a fluid outlet, said fluid outlet being closed by a puncturable or peelable membrane, and (b) a sleeve comprising a bore and having an end; said bore comprising a second engaging surface that externally snugly engages around the hose end to press on the hose against the first engaging surface in a manner effective to create a tight seal between the fitment and the hose end and, wherein the sleeve is ring-shaped and comprises coupling means at the periphery of the sleeve that includes a groove or at least one rib for engaging the complementary hose retaining means of the dispensing line and wherein the sleeve comes in abutting engagement against the terminal circumferential abutting wall of the first body member.

2. The hose fitment of claim 1, wherein the socket of the body member and bore of the sleeve have different surface shapes arranged to form a wedge effect on the hose end to resist disengagement when pulling forces are exerted on the hose.

3. The hose fitment of claim 1, wherein the sleeve has a front circumferential surface mating with an internal surface of the terminal circumferential abutting wall of the body member and connection means to closely attach the surfaces together.

4. The hose fitment of claim 3, wherein the two surfaces are attached by pressure fitting, gluing, heat sealing, snap fitting or a combination thereof.

5. The hose fitment of claim 1, wherein the body member and the sleeve engage along a hose length that is shorter than the external diameter of the hose.

6. A beverage or food disposable container for removable connection to a beverage or food dispensing line of a food or beverage dispenser comprising a reservoir containing a microbiologically sensitive food-forming or beverage-forming base, a hose attached to the reservoir at a first end, and a hose fitment attached at the second end of the hose to securely establish a fluid connection between the hose having an external diameter and a hose retaining means of a beverage or food dispensing line, the fitment consisting of: (a) a first body member having a socket extending along a longitudinal axis, said socket having a first engaging surface for internally engaging a hose end; said socket further comprising a first free end and second end terminating by a terminal circumferential abutting wall demarcating a fluid outlet, and (b) a sleeve comprising a bore and having an end; said bore comprising a second engaging surface that externally snugly engage around the hose end to press on the hose end against the first engaging surface in a manner effective to create a tight seal between the fitment and the hose end and, and the fitment being closed by a puncturable membrane.

7. The disposable container of claim 6, wherein the reservoir is a package containing a shelf stable low acid concentrate.

8. The disposable container of claim 7, wherein the reservoir contains a milk based concentrate.

9. The disposable container of claim 6, wherein the sleeve includes a groove or rib.

10. The disposable container of claim 6, wherein the socket of the body member and bore of the sleeve have different surface shapes arranged to form a wedge effect on the hose end to resist disengagement when pulling forces are exerted on the hose.

11. The disposable container of claim 6, wherein the socket progressively tapers from the terminal circumferential abutting wall to the hose at an angle that is lower than that of the sleeve bore so as to form a wedge area that is localized in a position that is closer to the free end of the socket.

12. The disposable container of claim 6, wherein the sleeve has a front circumferential surface mating with an internal surface of the terminal circumferential abutting wall of the body member and connection means to closely attach the surfaces together.

13. The disposable container of claim 6, wherein the two surfaces are attached by pressure fitting, gluing, heat sealing, snap fitting or a combination thereof.

14. The disposable container of claim 6, wherein the fluid outlet is closed by a puncturable or peelable membrane.

15. The disposable container of claim 6, wherein the body member and the sleeve engage along a hose length that is shorter than the external diameter of the hose.

16. A food and beverage hose fitment for securely establishing a fluid connection between a hose having an external diameter and a hose retaining means of a beverage or food dispensing line, consisting of: (a) a first body member having a socket extending along a longitudinal axis; said socket having a first engaging surface for internally engaging a hose end; said socket further comprising a first free end and a second end terminating by a terminal circumferential abutting wall demarcating a fluid outlet, and (b) a sleeve comprising a bore and having an end; said bore comprising a second engaging surface that externally snugly engages around the hose end to press on the hose against the first engaging surface in a manner effective to create a tight seal between the fitment and the hose end and, wherein the sleeve is ring-shaped and comprises coupling means at the periphery of the sleeve that includes a groove or at least one rib for engaging the complementary hose retaining means of the dispensing line and wherein the sleeve comes in abutting engagement against the terminal circumferential abutting wall of the first body member, wherein the socket progressively tapers from the terminal circumferential abutting wall to the hose at an angle that is lower than that of the sleeve bore so as to form a wedge area that is localized in a position that is closer to the free end of the socket.

17. The hose fitment of claim 16, wherein the socket of the body member and bore of the sleeve have different surface shapes arranged to form a wedge effect on the hose end to resist disengagement when pulling forces are exerted on the hose.

18. The hose fitment of claim 16, wherein the sleeve has a front circumferential surface mating with an internal surface of the terminal circumferential abutting wall of the body member and connection means to closely attach the surfaces together.

19. The hose fitment of claim 18, wherein the two surfaces are attached by pressure fitting, gluing, heat sealing, snap fitting or a combination thereof.

20. The hose fitment of claim 16, wherein the body member and the sleeve engage along a hose length that is shorter than the external diameter of the hose.

* * * * *